United States Patent [19]

Novak et al.

[11] Patent Number: 4,926,345
[45] Date of Patent: May 15, 1990

[54] ROBOTIC COMPONENT LEAD TRIMMER

[75] Inventors: C. Tim Novak, Fullerton; Thomas J. Alt, Chino; Arnold D. Chapman, Orange; David M. Driscoll, Brea, all of Calif.

[73] Assignee: Hughes Aircraft Company, Los Angeles, Calif.

[21] Appl. No.: 173,685

[22] Filed: Mar. 25, 1988

[51] Int. Cl.$^5$ .............................................. B23P 19/00
[52] U.S. Cl. ................................... 364/513; 901/10; 901/41; 901/46; 29/566.3; 83/409.2
[58] Field of Search .............. 364/513, 474.02, 474.18, 364/474.37, 560, 474.09; 901/10, 33, 34, 41, 46; 29/566.1, 593, 566.3; 83/99, 167, 409.2, 580

[56] References Cited

U.S. PATENT DOCUMENTS

| | | | |
|---|---|---|---|
| 4,072,077 | 2/1978 | Morgan | 83/418 |
| 4,485,548 | 12/1984 | Janisiewicz | 29/566.3 |
| 4,530,456 | 7/1985 | Michelotti | 901/46 |
| 4,531,192 | 7/1985 | Cook | 901/46 |
| 4,539,878 | 9/1985 | Linker et al. | 83/99 |
| 4,542,467 | 3/1985 | McMurty | 364/474.37 |
| 4,598,456 | 7/1986 | McConnell | 29/593 |
| 4,624,160 | 11/1986 | Linker et al. | 29/566.3 |
| 4,644,633 | 2/1987 | Jones et al. | 29/566.3 |
| 4,665,493 | 5/1987 | Hattori | 364/474.37 |
| 4,679,331 | 7/1987 | Koontz | 364/474.37 |
| 4,691,419 | 9/1987 | Keeler et al. | 29/566.3 |
| 4,759,112 | 7/1988 | McLean et al. | 29/566.3 |

FOREIGN PATENT DOCUMENTS 2083658 3/1982 United Kingdom ........... 364/474.37

Primary Examiner—Allen MacDonald
Attorney, Agent, or Firm—W. K. Denson-Low

[57] ABSTRACT

A robotic lead trimmer employing a sensor probe guided over a printed wiring board by a robot to determine the contour of a printed wiring board and a lead trimming element guided by the robot to automatically follow the determined contour of the board during lead trimming to achieve tight trimming tolerances. The sensor probe in conjunction with a fixed sensor is employed to determine an offset factor related to dimensional variations in the lead trimming element in order to impart additional accuracy to the lead trimming operation. An air ionizer and blower are utilized to neutralize static charge and remove debris. The robotic lead trimmer may be enclosed and utilized in conjunction with a tooling shuttle which receives a printed wiring board and transfers it to within the working envelope of the robot.

14 Claims, 9 Drawing Sheets

ROBOTIC COMPONENT LEAD TRIMMER

BACKGROUND OF THE INVENTION

1. Field of the Invention

The subject invention relates to automatic process equipment, and more particularly, to robotic work equipment.

2. Description of Related Art

Typically, in the prior art, component leads have been trimmed individually by hand or by some form of router mass lead trimmer. Hand trimming is normally used when trimming before wave solder or when no exposed lead base metal is allowed. The router method involves using a mass lead trimmer to trim leads after wave solder.

It has recently appeared desirable to trim leads to within 0.254 mm (0.010 inch) above the surface of printed wiring boards (PWBs), for example, in order to enable the packing of circuit cards closer together in confined areas such as in submarines. Mass lead trimming used after wave solder is fast, but the large blade required cannot adjust for the inherent warp in every PWB. As a result, PWBs can be severely damaged when trimming to tolerances as tight as 0.254 mm (0.010 inch).

Hand trimming to achieve tight tolerances is slow and laborious, often taking more than 30 minutes to trim a board. It also suffers from lack of uniformity, inability to trim hard leads, and the likelihood of fracturing solder joints if trimming is performed after solder.

Thus, there has been a need in the prior art to flexibly automate lead trimming operations in order to achieve tight trim tolerances and increase quality. It would be highly desirable not only to be able to trim to within 0.254 mm (0.010 inch) of the PWB surface, but also to trim to the contour or warpage of the board.

SUMMARY OF THE INVENTION

It is therefore an object of the invention to automate lead trimming apparatus;

It is another object of the invention to provide lead trimming apparatus capable of automatically trimming to tight tolerances;

It is another object of the invention to provide lead trimming apparatus capable of tracking circuit card or PWB contour changes; and It is yet another object to increase quality of lead trimming apparatus.

The lead trimming system according to the invention includes a robot and a unique end effector. The end effector includes a lead cutter and a sensor probe. The sensor probe is lowered to an extended probe position and scanned across the circuit board by the robot. The sensor probe samples a number of sense points on the board by contacting the board and thereby activating a force sensor switch to produce a signal to the robot indicative of the distance the probe had to descend to contact the surface of the board. In this manner, the sensor probe measures warpage across the board so that the cutter can accurately follow the warpage and properly trim leads extending above the board.

According to additional features of the preferred embodiment, the end effector also mounts an air blower for removing debris and an air ionizer for neutralizing static charges. Additionally, apparatus is provided to enable the robot to determine an offset factor to compensate for cutter height variation.

BRIEF DESCRIPTION OF THE DRAWINGS

The just-summarized invention will now be described in detail in conjunction with the drawings of which.

DETAILED DESCRIPTION OF THE PREFERRED EMBODIMENTS

Figure 1:
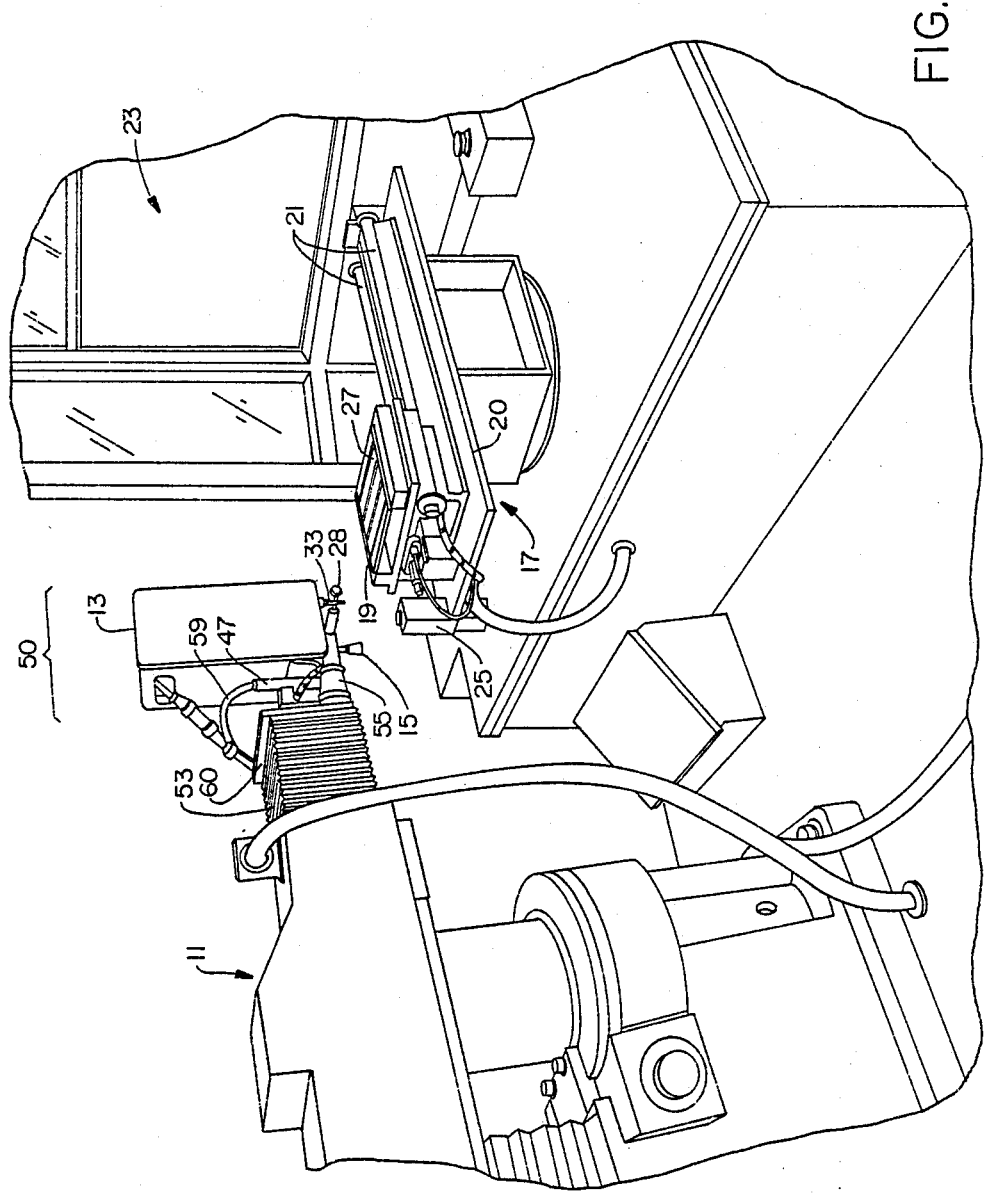
FIG. 1 is a perspective of the preferred embodiment.
Figure 2:
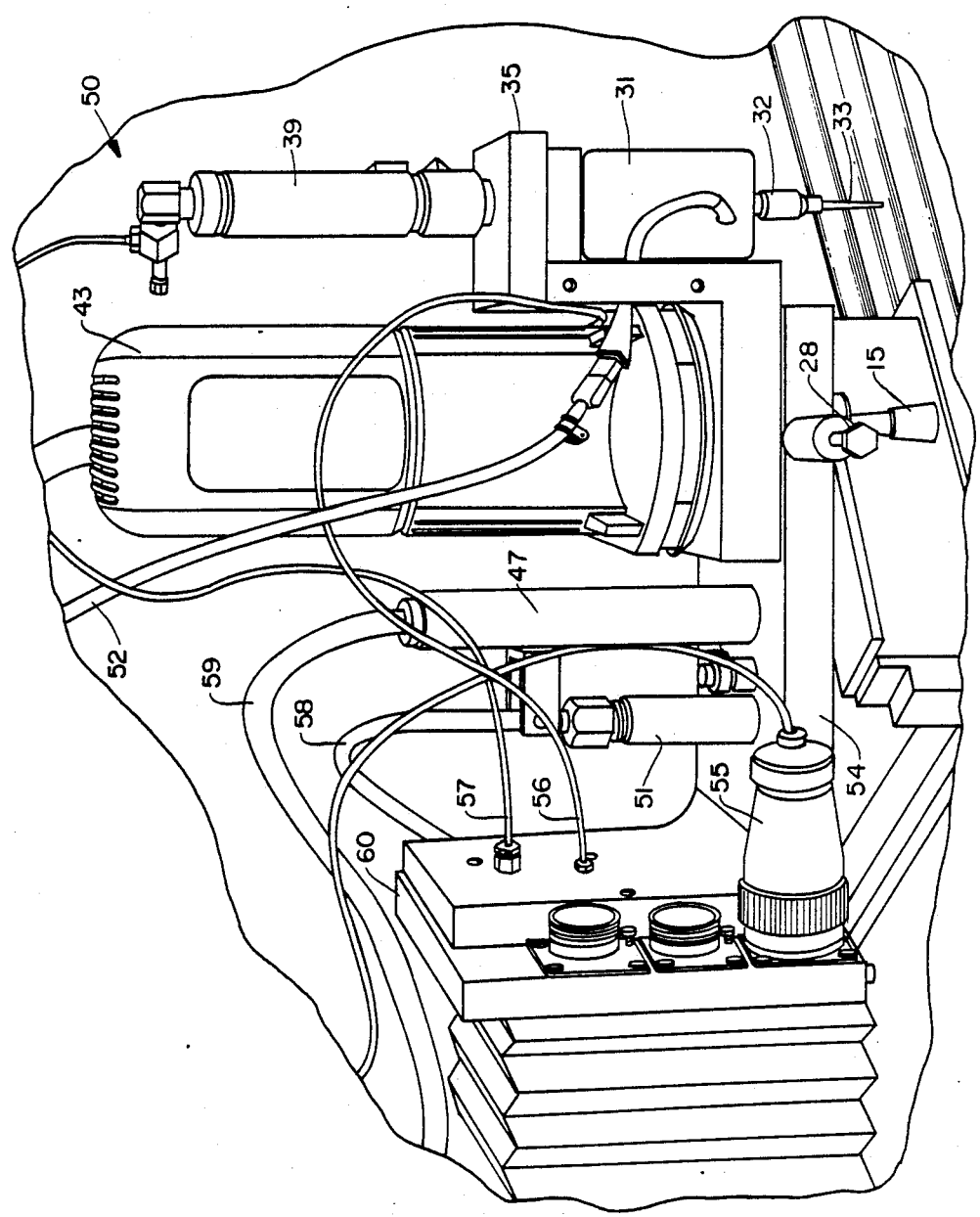
FIG. 2 is a perspective illustrating the end effector of the preferred embodiment.
Figure 3:
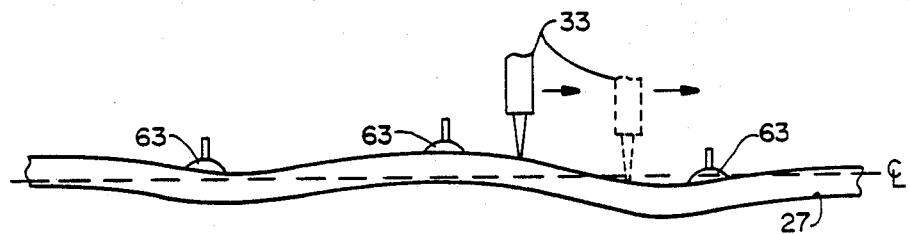
FIG. 3 is a schematic diagram illustrating probing of a PCB surface.

With reference to FIG. 1 and FIG. 2, the preferred embodiment is configured utilizing a robot 11 and an end effector 50 attached thereto which includes a cutting element or lead cutter 15 and a load cell sensor probe 33 mounted on an extended arm 53. The robot 11 provides three-dimensional XYZ translation of the end effector 50 and its associated cutter 15 and load cell sensor probe 33. A robot usable in the preferred embodiment is the Seiko D-Tran RT3000, which provides a relatively high degree of accuracy.

The lead cutter 15 is driven by a motor 43 (FIG. 2) within a housing 13 (FIG. 1) and serves to trim leads on a printed wiring board 27, mounted on a tooling shuttle 19. The tooling shuttle 19 translates linearly along two carriage arms 21 between a window 23 and the robot 11. An operator may cause the tooling shuttle 19 to move to the window 23 in order to place a circuit card 27 on the tooling shuttle 19. The tooling shuttle 19 then moves into operating position at the other end of the carriage arms 21.

The carriage arms 21 and tooling shuttle 19 are mounted on a platform 20. A force control switch 25 is also mounted on the platform 20. The force control switch 25 provides a fixed sensor, which cooperates with the sensor probe 33 to determine an offset factor for adjusting the height of the cutter 15, as will be described in more detail hereafter.

In FIG. 2, the housing 13 is removed to reveal further components of the end effector 50 of the preferred embodiment. As illustrated, these components include a blower 51, an air ionizer 47, and the motor 43. The air ionizer 47 and blower 51 are mounted on an extension arm 54, which attaches to the A-axis mounting bracket 60 of the robot 11.

At the front of the extension arm 54, a mounting bracket 35 is attached. The mounting bracket 35 mounts the motor 43 and an air cylinder 39. This mounting approach allows immediate replacement of dynamic elements to minimize down time.

The motor 43 has a drive shaft (not shown), which extends through the mounting bracket 35 and extension arm 54 for connection to the lead cutter 15. The air cylinder 39 has a drive shaft 36 (FIG. 5) connected to a force control switch 31 to which the load cell sensor probe 33 is attached. The air ionizer 47 and air blower 51 extend through and output beneath the extension arm 54 and serve to neutralize static charges and remove lead debris during the lead cutting operation of lead cutter 15.

Additional components shown in FIG. 2 include an external I/O connector 55, a probe retract air supply 56, a probe extend air supply 57, a lead blow-off air source 58, an ionizer supply line 59, and a motor shaft pin lock 28. The external I/O connector 55 interfaces between the "GRIP" I/O connector of the robot 11 and an external work station. The probe air supplies 56, 57 supply compressed air for extending and retracting the probe 33. The blow-off air source 58 provides air for the blower 51, while the ionizer supply line 59 supplies power to the ionizer 47.

The basic operation of the preferred embodiment may be generally understood with reference to FIGS. 3 through 6. In order to achieve accurate cutting to within a 0.254 mm (0.010 inch) tolerance of the solder fillets 63 on a printed wiring board (PWB) or circuit card 27, the sensor probe 33 is lowered to an extended probe position by operation of the air cylinder 39 and scanned across the circuit board 27 by the robot 11. The sensor probe 33 may sample, for example, seven sense points in each row of leads on the board 27. The probe descends in order to contact the board 27 and thereby activate the force sensor switch 31 to produce a signal to the robot indicative of the distance the probe 33 had to descend to contact the surface of the board 27. The number of sense points tested and the path followed by the sensor 33 can be varied in numerous ways apparent to those skilled in the art. In this manner, the sensor probe 33 measures warpage across the board 27 so that the cutter 15 can accurately follow the warpage and properly trim leads extending above the board.

Figure 4:
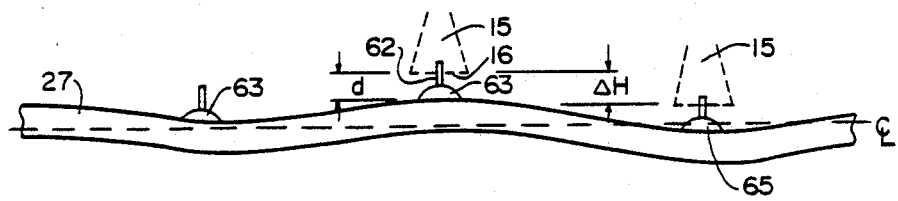
FIG. 4 is a schematic diagram illustrating lead cutting.

FIG. 4 illustrates the lower edge 16 of the conically tapered cutter 15 positioned in cutting position about a lead 62 over a solder fillet 63 at a distance "d" from the circuit board 27. The distance "d" is caused to be constant by the robot 11 as the cutter 15 moves across the board 27, for example by lowering the cutter by an amount or "cut height" $\Delta H$ as shown in FIG. 4.

In order to insure accurate cutting by the cutter 15, the precise distance between the lower edge 16 of the cutter 15 and the end of the probe 33 is determined. During operation of the apparatus, this distance is frequently checked in order to compensate for height variation of the cutter 15, particularly when replacing a worn cutter 15 with a new cutter 15. The manner in which this dimensional difference or calibration operation is performed is illustrated in connection with FIGS. 5 and 6.

Figure 5:
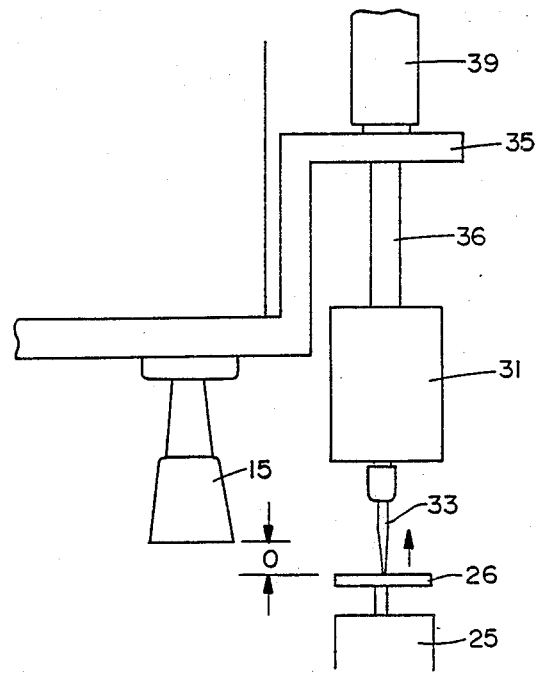
FIG. 5 is a perspective illustrating calibration of the preferred embodiment.

FIG. 5 illustrates the force control switch 25, which may be an Interlaken FS 500-C10, as made by Interlaken Technology Corporation, Minneapolis, Minnesota. The force control switch 25 mounts a sensor element 26. This sensor element 26 may be, for example, a flat-end contact point, special form number 20, ¾ inches in diameter, Part No. 6632/20, as manufactured by Starrett, Athol, Mass. 01331. The sensor probe 33 may be a special Form No. 12, Part No. 6632/12, also as manufactured by Starrett. The force control switch 31 may be an FSE 25-025, as manufactured by Interlaken Technology Corporation, Minneapolis, Minn. The conical cutter 15 may be a Part No. 86MMW0070, as manufactured by Severance, Santa Ana, Calif.

Figure 6:
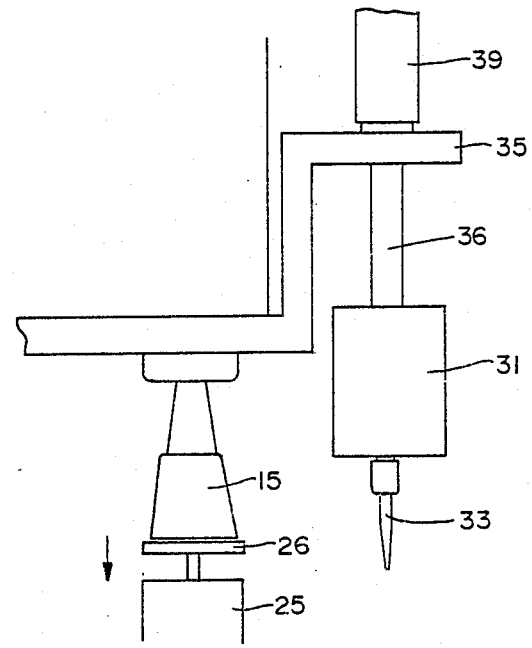
FIG. 6 is a perspective illustrating calibration of the preferred embodiment.

In order to determine the offset factor, the probe 33 is positioned over the force control switch 25 by the robot 11. The air cylinder 39 is then activated to extend the force control switch 31 to the probe mode position, as shown in FIG. 5. In this position, contact pressure on the probe 33 equaling a "Set-Point" gram load causes the switch 31 to activate and signals the robot 11 to record the current "Z" axis value, denoted "$Z_1$". The "$Z_1$" value is recorded when the probe 33 contacts the sensor element 26, which remains static under any load in the gram range. The cutter 15 is then positioned over the same sensor element 26 by the robot 11 and lowered into contact with the sensor element 26, as shown in FIG. 6. The force control switch 25 activates due to the excess load which the cutter 15 exerts on sensor element 26 and signals the robot to record a second "Z" axis value, denoted "$Z_2$". Thus, the tip of the probe 33 and the bottom of the cutter 15 cause recordation of a Z value relative to the same point, the sensor element 26. The offset is then determined by calculating $Z_1 - Z_2$. During these operations, both the sensor probe 33 and the cutter element 15 are controlled to first descend rapidly to 0.254 mm (0.010 inch) above the surface of the sensor element 26 and then to descend slowly, in order to dampen any vibration created by the high speed motion. As noted, the force at which the force control switch 31 triggers is set in the gram range at a point where the probe 33 will not deflect the circuit board 27 and where general movement of the probe 33 by the robot 11 will not cause a trigger output.

Figure 7:
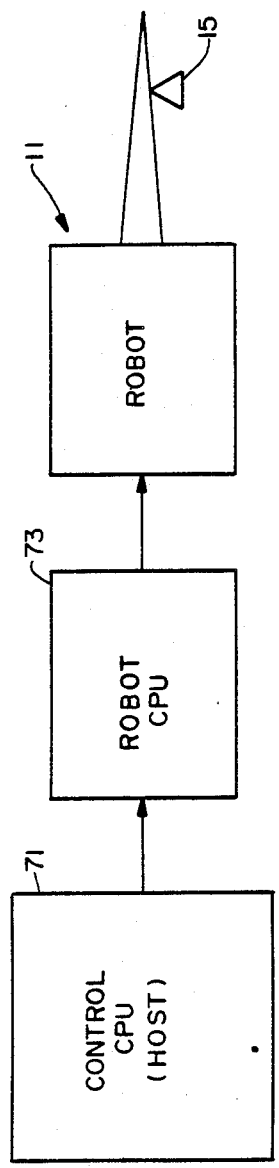
FIG. 7 is a schematic block diagram of a robot control system according to the preferred embodiment.

The robot control system is illustrated in FIG. 7. The system includes a robot operating program which runs in a robot CPU 73 and a robot control program which runs on a master computer 71 at a work station monitor. The overall sequence of operation of the embodiment of FIG. 1, as controlled by the control system, is as follows. The operator enters a part identification number at the work station monitor and the robot control program for that part downloads from the master computer 71. The operator loads a board onto the tooling shuttle 19 and closes the access window 23, activating an interlock. The robot 11 is thereby completely enclosed, and all access is protected by interlocks to prevent operator injury due to flying lead debris.

After closing the window 23, the operator presses dual switches at the work station in a "two hand tie down" operation, which activates the operating cycle. The tooling shuttle 19 automatically clamps shut and shuttles into the work envelope of the robot 11

The robot 11 executes a calibration cycle, as discussed in connection with FIGS. 5 and 6, to determine the precise dimensional difference between the bottom of the cutter blade 15 and the bottom of the extended probe 33. As noted, this routine allows for height variation discrepancies, for example, when replacing a worn cutter 15 with a new cutter 15.

The robot 11 then executes the seven sense points in each sense path in each row, row after row, until the probe sensing operation is complete. The cutter path is calculated and the robot 11 moves the cutter along a contoured path that trims the leads to the specified height, as previously discussed.

The air ionizer 47 working in conjunction with air directed at the cutter 15 by the blower 51, neutralizes any static charge generated. The air blower 51 also removes lead debris from the surface of the board 27.

The shuttle 19 then cycles to the load/unload position, and the operator opens the access window and unloads the board 27. Subsequent boards 27 in the production run need only be loaded and run.

Figure 8:
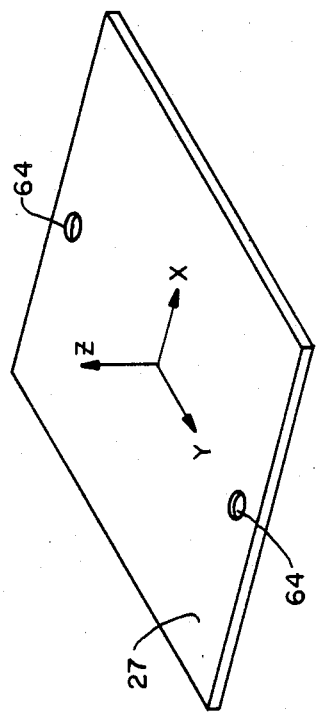
FIG. 8 is a perspective view of a PCB.

As shown in FIG. 8, for the purposes of the lead-cutting system, the robot 11 is controlled in three axes of movement: X, Y and Z. The X-axis is perpendicular to a line connecting the tooling holes 64 on the board 27 in the plane of the board's surface. The Y-axis is also located in the plane of the board's surface, perpendicular to the X-axis. The Z-axis is in the vertical direction, perpendicular to the plane of the surface of the board 27. Lead cutting is done as a series of paths in the Y direction.

As indicated, since most circuit boards are not perfectly flat, the robot 11 is made to follow the contour of the board 27 being trimmed. By probing the board 27 at various points with the sensor probe 33, the robot program builds a surface profile of the board, which is used by the robot program to calculate the cutter height (Z coordinate) at each cutting position along the cutter paths.

It is thus necessary to program the robot to define its operation, i.e., the probing paths and sense paths it is to follow. Part programming according to the preferred embodiment consists of specifying one or more probing paths, called "sense paths", and one or more cutter paths to be associated with each sense path specified. A sense path is described by its starting and ending coordinates in X and Y. A cutter path is described by its offset in X from its associated sense path. The robot program automatically divides each sense path into six equal segments whose end-points will be probed, giving a total of seven sense points per sense path. Similarly, the robot program divides a cutter path into six equal segments with seven end-points or "cutter points". Of course, more or less than six segments can be used, depending upon the application. When the cutting operation is performed, the Z-coordinates or heights obtained from the probing sequence are used to establish the height of the cutter at cutter points associated with the current set of sense points. In normal lead-trimming operations, two programs are utilized, respectively denoted ROBCTL.EXE, which runs on the master computer 71 and POSTWAVE.DRL, which runs in the robot CPU 73. The following discussion describes how these two programs act and interact during normal operations.

A. When the operator types "PRODUCTION", the ROBCTL program is automatically activated. ROBCTL establishes the communication link with the robot and downloads POSTWAVE.DRL to the robot CPU.

B. ROBCTL displays a menu for the operator. The choices on this menu are: "process a part", "change cutter blades" and "log off".

C. If the operator selects "process a part", ROBCTL prompts for the part number and serial number of the card to be trimmed. ROBCTL then attempts to open a file in the PRODUCTION directory with a filename of "partnumber" T, where "partnumber" is the part number the operator had previously entered. If the file is found, ROBCTL downloads the contents to the robot. On subsequent runs of the same part number (with no intervening cards with a different part number), ROBCTL does not resend "partnumber" T.

D. ROBCTL then logs the part number and serial number and the start time of the run.

E. ROBCTL issues a "START" command to the robot 11. At this point, POSTWAVE.DRL is activated in the robot CPU 73. ROBCTL is now inactive until the part processing is complete. It merely looks for a signal from the robot 11 that the part is finished.

F. When ROBCTL receives the "END" signal from the robot 11, it logs the end time and status of the job (normal, processing error, etc.) and again puts up the menu.

The translation or "T-points" and variables in the file downloaded to the robot 11 by the robot control program which describe the paths to be followed during processing of a particular type of circuit board are listed as follows, according to the Seiko Robot format:

a. Translation points:
 1. T1–T10: starting coordinates of sense-paths 1–10 (X and Y, only).
 2. T11–T20: ending coordinates of sense-paths 1–10 (X and Y, only).
 3. T101–T200: X-offsets for cutter paths associated with sense-paths 1–10 (X, only): T-points 1–10 are for sense-path 1, T-points 11–20 for sense-path 2, etc.

b. Variables:
 1. N: specifies whether downloaded coordinates are in relative or absolute format. N=0 means coordinates are relative to the zero-point established by the left-hand tooling pin. N=1 means that the coordinates are absolute, i.e., relative to robot zero. Relative coordinates are created by the off-line part-programming software; absolute coordinates are created by the on-line programming routine.
 2. O (oh, not zero): number of sense-paths programmed for part.
 3. P-Y: number of cutter-paths associated with sense-paths 1–10.

Certain translation points are generated by or contained in the robot part cutting program. These are described as follows:

a. T201–T270: Height of the board as measured by the probing routine, seven T-points per sense-path: T-points 201–207 are for sense-path 1, T-points 208–215 for sense-path 2, etc.
b. T31: Cutter height
c. T32: Cutter height to probe height fine tuning factor.
d. T41: Dummy T-point used to create pallets.
e. T42: Point on the X-axis used to create frame.
f. T43: Y-offset added to start of cutter path to make sure cut begins in front of sense path.
g. T45: Y-offset added to the end of cutter paths to compensate for robot geometry.
h. T50: Amount of travel in Z-direction during searches.
i. T51: Z-value for high-speed approach to board during probe sequence.
j. T52: Probe-height to cutter-height offset plus tuning factor to adjust cutter height above board.
k. T53: X-offset probe to cutter.
l. T55: Point to which the robot moves between routines.
m. T60: Cutter approach point for calibration.

n. T61: Cutter search point for calibration.
o. T62: Cutter height generated by calibration
p. T63: XY coordinates (Z=0.) of cutter approach point for calibration.
q. T64: Probe approach point for calibration.
T65: Probe search point for calibration.
s. T66: Probe height generated by calibration.
t. T67: XY coordinates (Z=0.) of probe approach point for calibration.
u. T68: Z-value used to generate a T-point to which robot moves in transition from cutter calibration to probe calibration.
v. Calibrated probe-height to cutter-height offset: i.e., T52 value adjusted by calibration.
w. T80: Zero point for relative coordinates, i.e., center of left-hand tooling pin.

It may be noted that part programming information, i.e., sense path and cut path specifications, can be generated either with an Offline Part-programming Utility OPU) or on-line with the robot 11 directly. When on-line programming is done, the resulting T-point data must be uploaded to the control computer 71. A special D-Tran Assembly Robot Language (DARL) program for the robot can be developed to allow on-line part-programming. On-line programming, however, is tedious and time-consuming and also ties up the robot 11. For this reason, almost all part-programming is done off-line.

The Offline Part-programming Utility (OPU) allows a planner to generate part-specific data for the robot lead-trimming application without tying up the robot 11. An OPU, which can run on an IBM Personal Computer, creates files which are suitable for downloading to the robot to control its operations during lead trimming.

The program defines a row as an X-coordinate offset from a defined point, for example, the center of a tooling pin hole 64. Two Y-coordinate offsets define "begin" and "end" points of the sense and cutter paths. The programmer is presented with a simple grid on screen. He holds the new model board in his hand, measures the offsets from the center of the connector eyelet and enters them in the chart. The programmer can define a maximum of ten sensing paths with a maximum of ten cutting paths to each sense path. He also defines the offset of the probe to the cutter path to assure that the probe does not sense the board contour at the location of a lead. Although the components on some boards are neatly arranged in rows, asymmetrical models can readily be programmed by using more path programming capacity.

Figure 9:
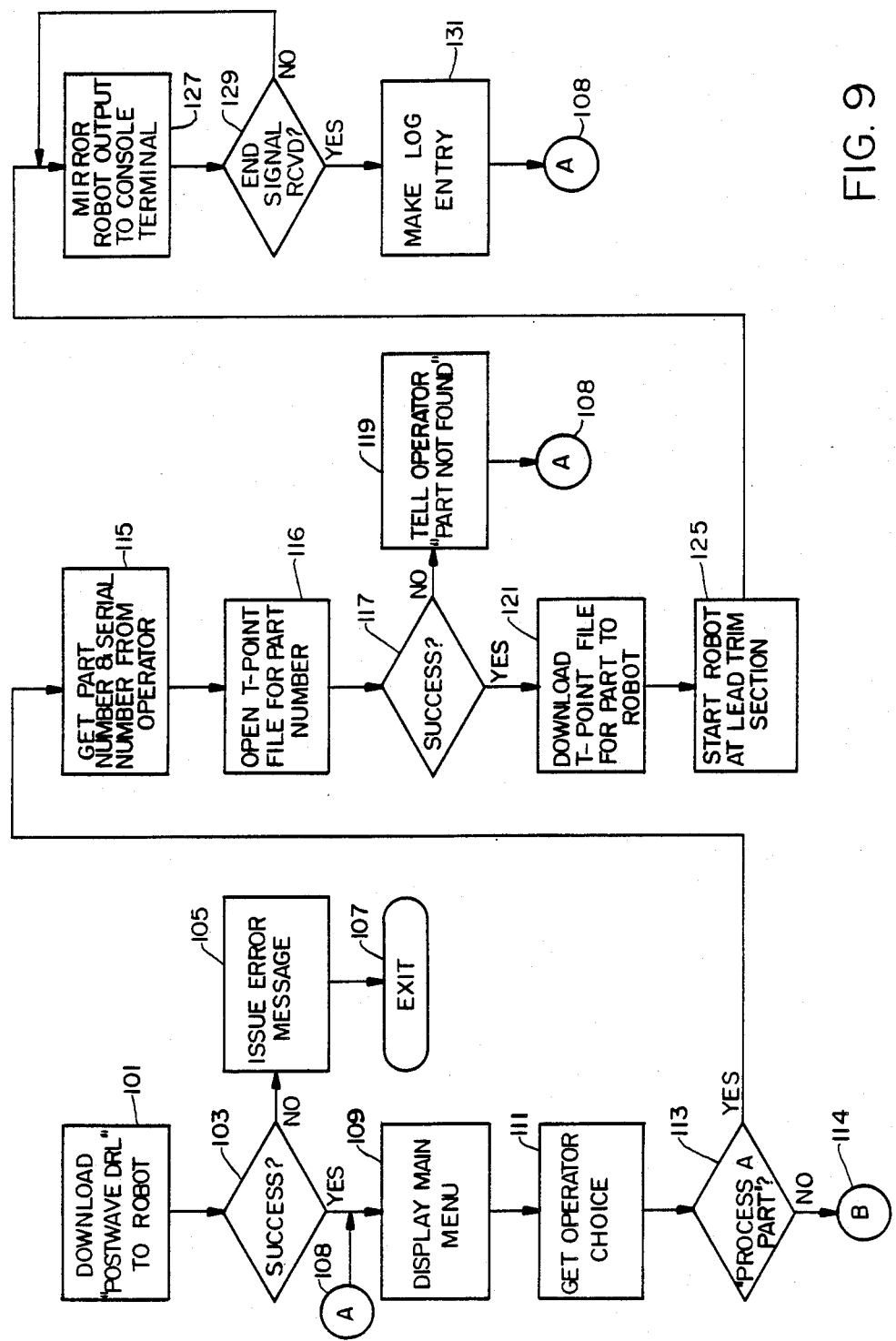
FIG. 9 is a flow chart useful in illustrating operation of the preferred embodiment.
Figure 10:
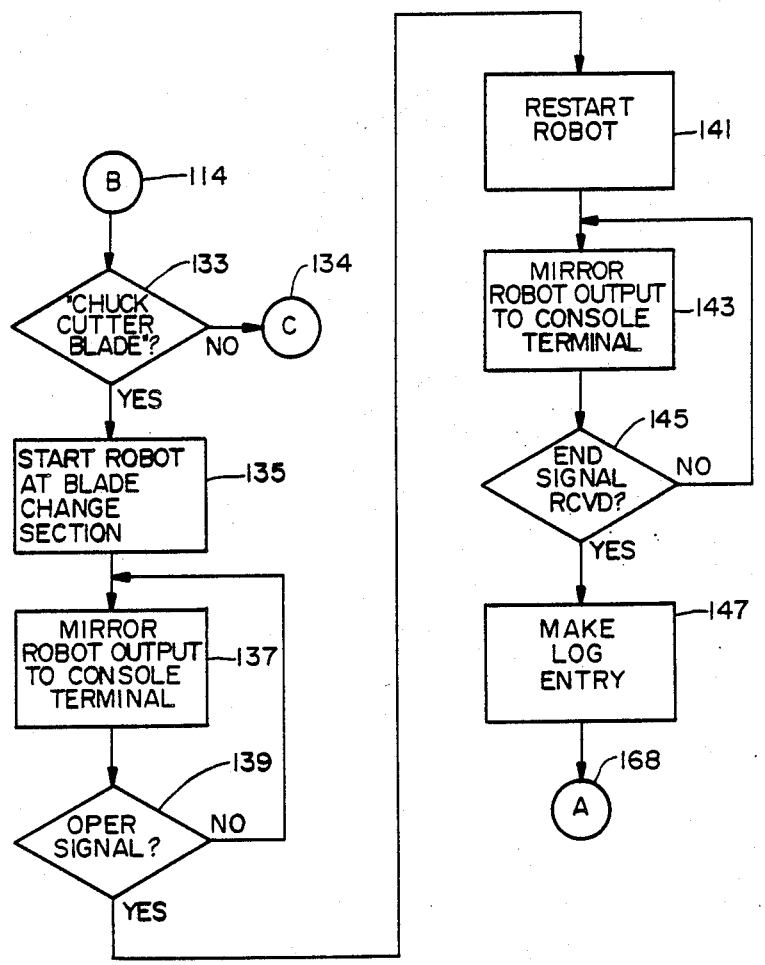
FIG. 10 is a flow chart useful in illustrating operation of the preferred embodiment.

The system operation and programming may be further understood by consideration of the flow charts shown in FIGS. 9–12. FIGS. 9 and 10 illustrate the host computer 71 robot control program. In the first step 101 of FIG. 9, postwave drill, the robot control program is downloaded to the robot 11. If there was an error in downloading, as tested at step 103, an error message is issued as indicated at step 105. Assuming this downloading is successful, the host computer 71 displays the main menu on its display screen at step 109. In response, the operator makes a choice to either process a part, change the blade or read engineering instructions, an optional file, as illustrated at step 111. If the part is to be processed, a decision is made at step 113, and the part number and serial number of the part are obtained from the operator at step 115. A T-point file for that part number is then searched for in the disk storage of the control computer 71. If success is not achieved as tested at step 117, the operator is informed that the part is not found, as indicated at step 119. If the part number is successfully found, the T-point file for the part is downloaded to the robot 11 as indicated at step 121, and the robot is instructed at step 125 to start the lead trim operation. In other words, the operator commands the robot to begin the lead trim operation, preferably by pressing a dual switch as previously described.

As discussed above, the T-point file contains variables in Seiko robotics language which instruct the robot 11 as to which path to follow. The robot output is mirrored to the console of the operator terminal, as indicated at step 127, to detect the robot end signal at step 129. The robot 11 will either answer by saying END 0, which indicates a successful operation, or END 1, which indicates an error. A log entry is made at step 131, and the flow returns to point A (108).

If, at test 113, a part is not to be processed, then the flow proceeds to point B (114) of FIG. 10 and tests for whether the cutter blade 15 is to be changed. If so, the operator is instructed to start the robot at the blade change section, as illustrated in step 135. The robot output is monitored at the console, as illustrated in step 137. The operator is told to hold down the shaft lock pin 28 while changing the cutter 15 and then told to change the blade and thereafter to hit return. At step 139, the program tests to determine whether the operator did hit return. If so, the robot is restarted, as illustrated at step 141. The robot output is again monitored to detect whether an end signal is received as illustrated at steps 143 and 145, and a log entry is made, as indicated at step 147.

Figure 11:
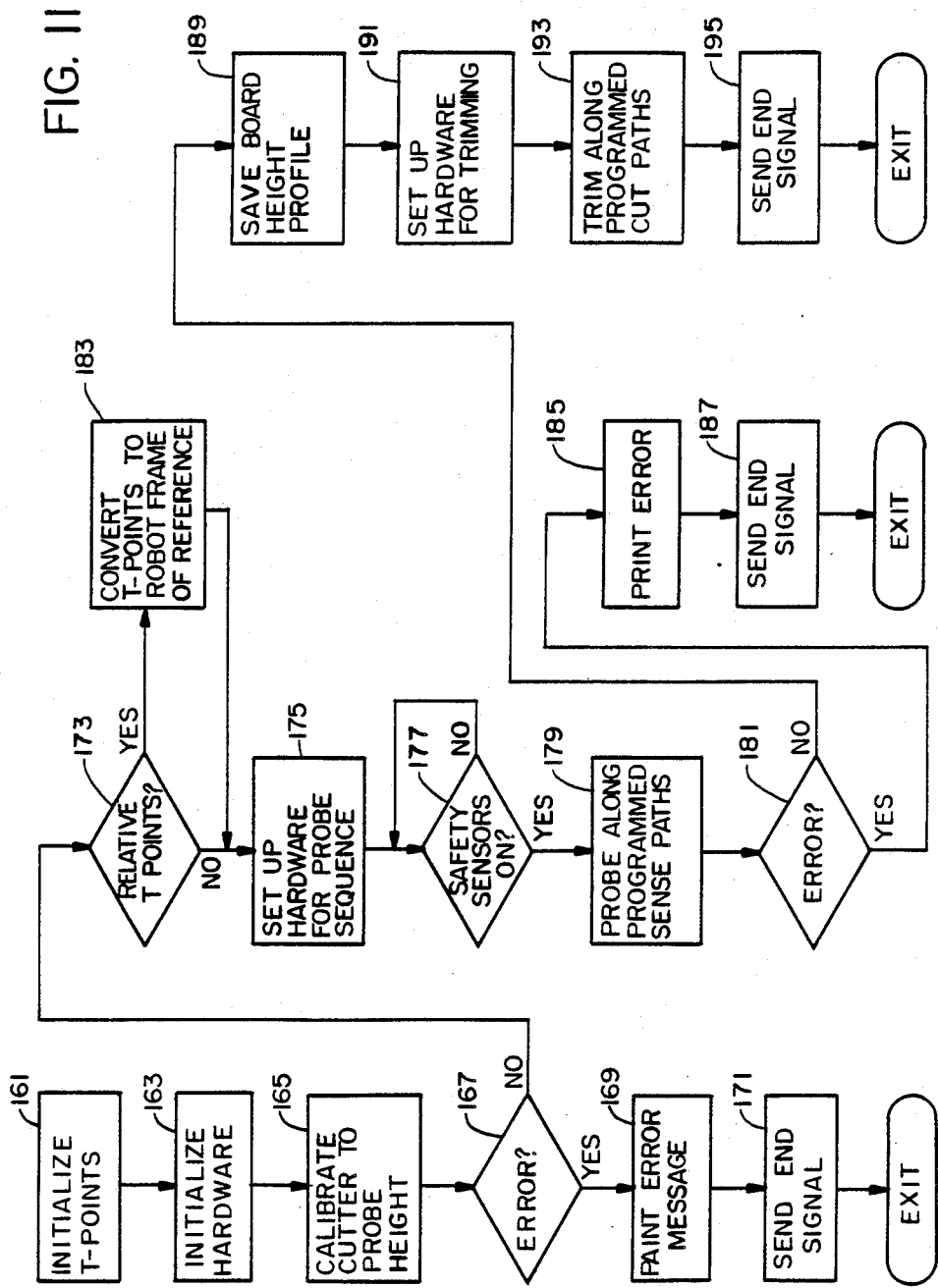
FIG. 11 is a flow chart useful in illustrating operation of the preferred embodiment.

The robot lead trim program (postwave DRL) is illustrated in FIG. 11 In the first step 161, the T-points are initialized. In step 163, the hardware is initialized. The probe 33 is retracted, the air blower 51, the ionizer 47, and the motor 43, are turned off, and the tooling shuttle 19 is moved to the proper position for cutting. In the next step 165, the cutter-to-probe offset is calibrated. Here the robot is programmed to move the probe and cutter to the force control switch 25 and perform the calibration operation discussed with respect to FIGS. 5 and 6.

If an error occurs in the calibration operation at test 167, an error message and end signal are generated, as indicated as steps 169 and 171, and the routine is exited. If there is no error, the relative T-points are converted to the robot frame of reference, as indicated at test 173 and step 183. After calibration, the probe 33 is extended for the probe sequence at step 175. Safety interlocks are checked at test 177 to determine whether, for example, the window 23 has been closed and the appropriate button pressed by the operator. The robot 11 then conducts the probe 33 along the programmed sensor points on the circuit board 27 as indicated at step 179. If an error occurs, it is tested for at a test 181. For example, whenever the probe values determined by the probe 33 are beyond acceptable values, an error message is printed, an end signal generated, and the routine exited, as indicated at steps 185 and 187. In step 179, the starting and end points of the probe positions are specified and the robot 11 divides the path into the seven segments tested by the probe 33. If no error is found at test 181, the board height profile determined by the probe 33 is stored by the robot 11 at step 189, and the hardware is set up for lead trimming, as indicated at step 191. This setup includes retracting the probe 33, and turning on the air blower 51, the ionizer 47, and the cutting blade 15. Cutting then proceeds as indicated as step 193 along the programmed cut paths. An end signal is generated at step 195, and the cutter 15 is moved to the neutral position.

Figure 12:
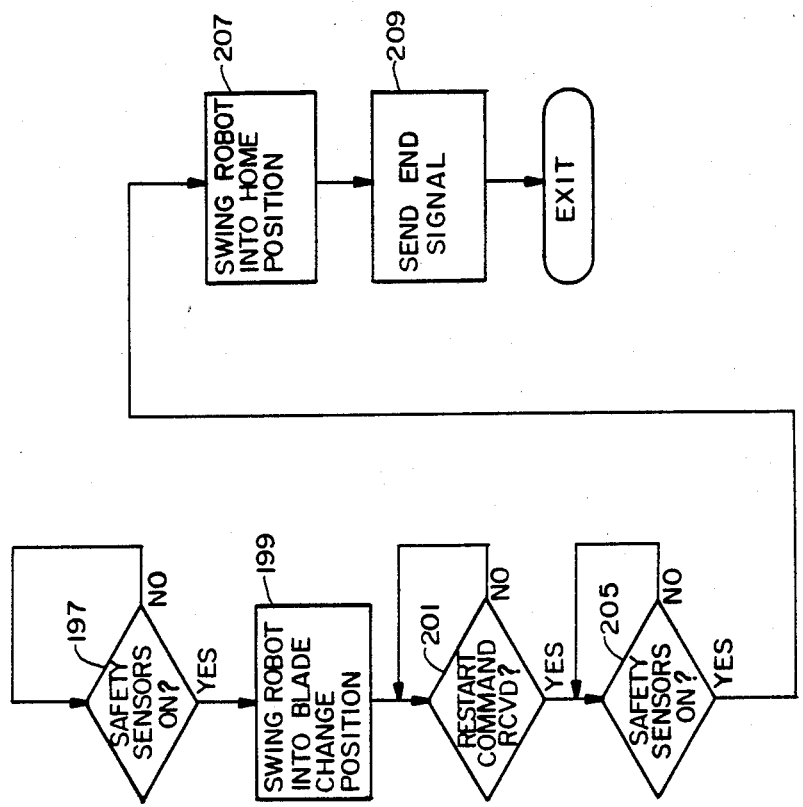
FIG. 12 is a flow chart useful in illustrating operation of the preferred embodiment.

FIG. 12 illustrates a flow chart of the robot's blade change routine. Safety sensors are checked at test 197 and the robot 11 is swung into blade change position at step 199. A test for receipt of a restart command is executed at step 201. Safety sensors are again checked at test 205. The robot 11 is swung into home position at step 207 and an end signal generated at step 209.

As may be appreciated, the cutter path for each board is unique to that individual board. Optimum performance of the preferred embodiment depends on the ability of the robot 11 to perform to very tight accuracy specifications. (Accuracy is a machine specification expressed as a tolerance of the ability of the robot to move to an externally programmed point defined by coordinate location only.) The repeatability specification of the Seiko robot is 0.0254 mm (0.001 inch), which has proved satisfactory.

Robot accuracy is also dependent on off-line programming board model data. When the first board of a given model number is run, the sense points where the probe 33 extends to the board surface are defined only by coordinate and successful positioning again depends on the accuracy of the robot 11.

The preferred embodiment offers many production benefits: A reduction in direct touch labor and cycle time through the shop; reduced rework costs due to a higher quality of trim; and enhancement of overall productivity. The use of a smaller cutter 15 also avoids damage which can result when a larger blade, typical of prior art mass lead trimmers, is used.

Those skilled in the art will appreciate that many adaptations and modifications of the just-disclosed preferred embodiment may be made without departing from the scope and spirit of the invention. Accordingly, it is to be understood that, within the scope of the appended claims, the invention may be practiced other than as specifically described herein.

What is claimed is:

1. Apparatus for trimming leads extending through a surface comprising:
   first sensor means for contacting said surface and generating signals indicative of the contour of said surface;
   trimmer means for trimming said leads; and
   means for mounting said first sensor means and said trimmer means and for receiving said signals, and for causing said first sensor means to contact said surface and generate said signals, and further responsive to said signals to cause said trimmer means to simultaneously track said contour and trim said leads;
   wherein said means mounting said trimmer means and first sensor means includes means for compensating for variations in the height of said trimmer means, said means for compensating including second sensor means responsive to said first sensor means and said lead trimmer means to determine an offset between said first sensor means and said lead trimmer means.

2. The lead trimming apparatus of claim 1 wherein said first sensor means comprises:
   a probe; and
   a force sensing means for sensing the force applied to said probe and producing an output signal at a selected force value.

3. The lead trimming apparatus of claim 2 wherein said trimmer means comprises:
   a cutter element; and
   means for driving said cutter element in a cutting motion.

4. The lead trimming apparatus of claim 1 wherein said means mounting said trimmer means and first sensor means comprises:
   robot means for moving and positioning said first sensor means and trimmer means.

5. The lead trimming apparatus of claim 4 wherein said trimmer means and first sensor means are mounted on an extended arm attached to said robot means.

6. The lead trimming apparatus of claim 5 wherein said robot means causes said first sensor means to contact a selected number of contact points on said surface and computes a path for said trimmer means to follow based on signals related to each of said contact points.

7. The lead trimming apparatus of claim 1 wherein said first sensor means comprises a probe means extendable to a probe position and wherein said second sensor means comprises:
   a force control switch; and
   a sensor element mounted on said force control switch.

8. The lead trimming apparatus of claim 6 wherein said first sensor means comprises probe means extendable to a probe position and wherein said second sensor means comprises:
   a force control switch; and
   a sensor element mounted on said force control switch.

9. The lead trimming apparatus of claim 8 wherein said robot means further includes an air ionizer means for neutralizing static charge created during a lead trimming operation.

10. The lead trimming apparatus of claim 9 wherein said robot means further includes an air blower means for removing lead debris during a cutting operation.

11. The lead trimming apparatus of claim 10 wherein said robot means operates in a work envelope and further including:
    means for enclosing said robot means and having an access port therein; and
    tooling shuttle means within said enclosing means for receiving an apparatus having leads to be trimmed from an operator and transferring it to within the work envelope of said robot means.

12. The lead trimming apparatus of claim 8 wherein said robot means is a Seiko RT 3000.

13. Apparatus for trimming leads extending through a surface comprising:
    an arm;
    a lead trimmer having a cutting end;
    a probe;
    a force control switch mounting said probe;
    a motor means mounted on said arm for disposing said lead trimmer below said arm and for driving said lead trimmer in a trimming motion;
    means mounted on said arm for mounting said force control switch so as to position said probe above the cutting end of said lead trimmer, said mounting means including a pneumatic cylinder for extending said force control switch and probe such that said probe extends below the cutting end of said lead trimmer and for thereafter retracting said force control switch and probe; and robot means for mounting said arm and positioning said arm and lead trimmer to cut leads and for operating said pneumatic cylinder to extend and retract said force control switch and probe.

14. The apparatus for claim 13 wherein said mounting means is removable for allowing easy replacement of said pneumatic cylinder, force control switch, and probe.

* * * * *